US006302176B1

(12) United States Patent
Chen

(10) Patent No.: US 6,302,176 B1
(45) Date of Patent: Oct. 16, 2001

(54) DISK LABEL POSITIONING STRUCTURE

(76) Inventor: Su-Shun Chen, 3F, No. 7, Alley 2, Lane 397, Chi Hsien Rd., Lu Chou, Taipei Hsien (TW)

( * ) Notice: Subject to any disclaimer, the term of this patent is extended or adjusted under 35 U.S.C. 154(b) by 0 days.

(21) Appl. No.: 09/362,066

(22) Filed: Jul. 28, 1999

(30) Foreign Application Priority Data

Feb. 11, 1999 (TW) ............................................... 88202435

(51) Int. Cl.[7] .............................. B32B 31/00; B65C 1/00

(52) U.S. Cl. .......................... 156/391; 156/556; 156/580; 206/308.1

(58) Field of Search .................................... 156/556, 391, 156/574, 580; 206/224, 232, 308.1; 425/318

(56) References Cited

U.S. PATENT DOCUMENTS

| | | | | |
|---|---|---|---|---|
| 5,316,464 | * | 5/1994 | Lexell | 425/318 |
| 5,320,219 | * | 6/1994 | Ward | 206/224 |
| 5,715,934 | * | 2/1998 | Tobol et al. | 206/232 |
| 5,951,819 | * | 9/1999 | Hummell et al. | 156/556 |

FOREIGN PATENT DOCUMENTS

2763913 * 12/1998 (FR) .

* cited by examiner

*Primary Examiner*—Richard Crispino
*Assistant Examiner*—Sue A. Purvis
(74) *Attorney, Agent, or Firm*—Bacon & Thomas PLLC

(57) ABSTRACT

A disk label positioning structure includes a base and an elastic element. The base has a receiving space adapted for supporting a disk. The receiving space is centrally provided with a post adapted for positioning a through hole of the disk. The elastic element is provided in the receiving space in a position located at an outer edge of the post and having a size adapted to position a through hole of a label and a height smaller than that of the post. The through hole of the label may be fitted over and positioned at an outer periphery of the elastic element. The label is disposed in the receiving space with an adhering face thereof facing up. The disk is fitted over and positioned at the outer edge of the post with a face to be adhered to the label facing down. The disk is pushed downwardly by a uniform application of force to force the elastic element to displace downwardly to allow the face of the disk to be precisely adhered to the adhering face of the label.

6 Claims, 4 Drawing Sheets

DISK LABEL POSITIONING STRUCTURE

BACKGROUND OF THE INVENTION (a) Field of the Invention

The present invention relates to a disk label positioning structure, more particularly to a disk label positioning structure that enables a disk to be precisely and firmly adhered to an adhering face of a label.

(b) Description of the Prior Art

Conventional compact or optical disks are provided with a label. When the user no longer needs the data originally stored in a disk and wants to input new data therein, he/she often needs to prepare a new label and stick it to the original label on the disk or peel off the original label and then stick the new one to the original position so as to identify the new data stored in the disk.

However, there are advantages. When the user adheres the new label to the disk, since it is difficult to make the label precisely adhere to the disk in a proper position, a portion of the label may stick out from the disk. On the other hand, it takes time to make the label adhere to the disk in a precise manner. Furthermore, if the label projects from the disk, when the disk is inserted into a disk drive, the projecting portion will affect the reading of the data or even damage the components of the disk drive. Improvements are therefore necessary.

SUMMARY OF THE INVENTION

A primary object of the present invention is to provide a disk label positioning structure to facilitate adhering of a label to a disk in a precise and firm manner.

According to a first aspect of the present invention, a disk label positioning structure includes a base and an elastic element. The base has a receiving space adapted for supporting a disk. The receiving space is centrally provided with a post adapted for positioning a through hole of the disk. The elastic element is provided in the receiving space in a position located at an outer edge of the post and having a size adapted to position a through hole of a label and a height smaller than that of the post. The through hole of the label may be fitted over and positioned at an outer periphery of the elastic element. The label is disposed in the receiving space with an adhering face thereof facing up. The disk is fitted over and positioned at the outer edge of the post with a face to be adhered to the label facing down. The disk is pushed downwardly by a uniform application of force to force the elastic element to displace downwardly to allow the face of the disk to be precisely adhered to the adhering face of the label. The base may be provided with a cover to protect the disk in the receiving space and to facilitate carrying and storage.

According to a second aspect of the present invention, the post is further provided with an elastic material to increase the height thereof so that the disk may be more easily positioned on and fitted over the post. When the cover is put in place, it will not, due to the elasticity of the elastic element, be affected by the height and can compress the elastic element to rest upon the base.

According to a third aspect of the present invention, the post includes two inter-engaged hollow post elements of different diameters. The two hollow post elements accommodate therein a spring and are adapted to enable the disk to be positioned on and fitted over the post easier. When the cover is put in place, said cover will not, due to the elasticity of the elastic element, be affected by the height and can compress said the element to rest upon the base.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
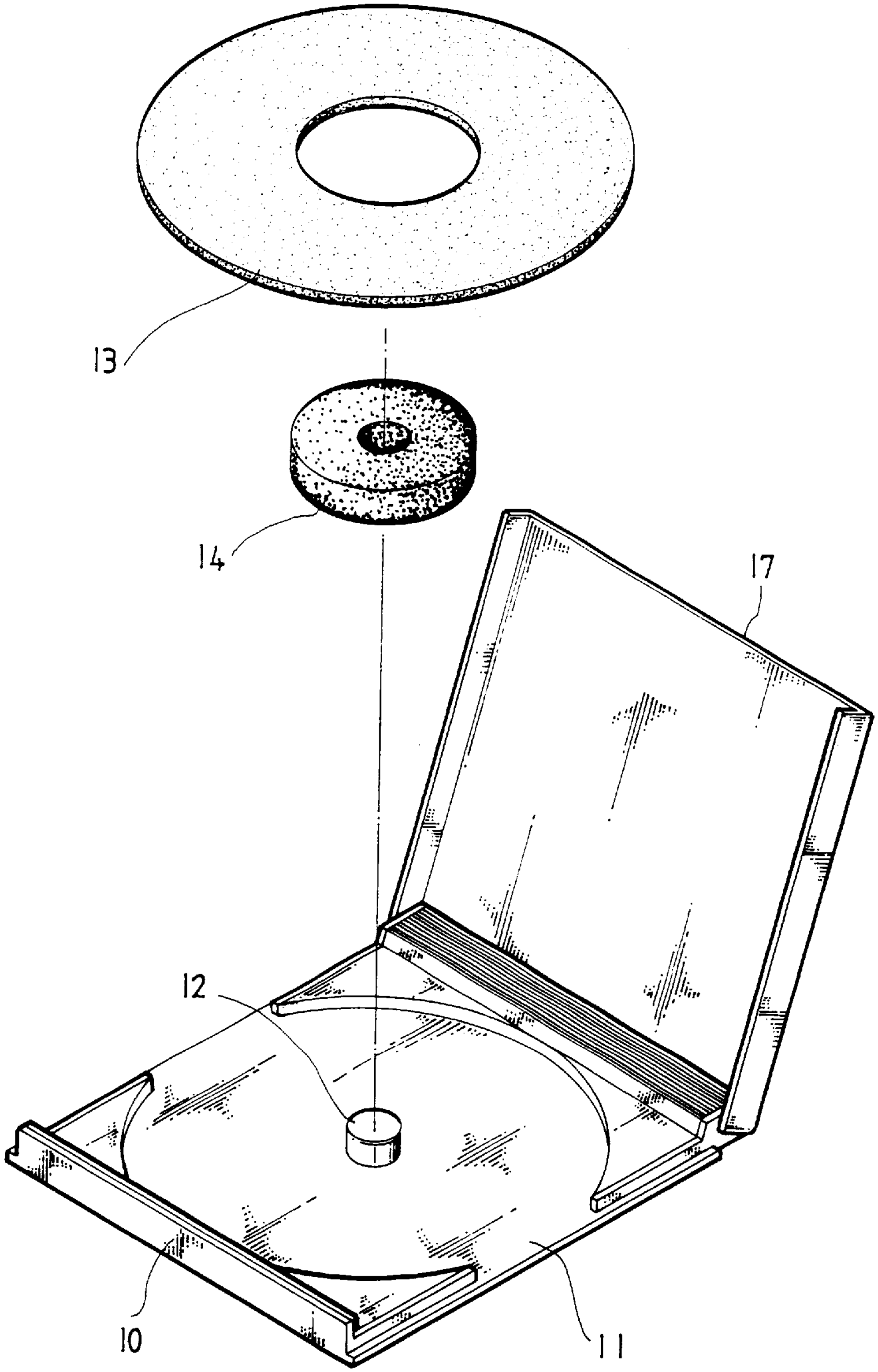
FIG. 1 is an exploded perspective view of a preferred embodiment of the present invention.
Figure 2:
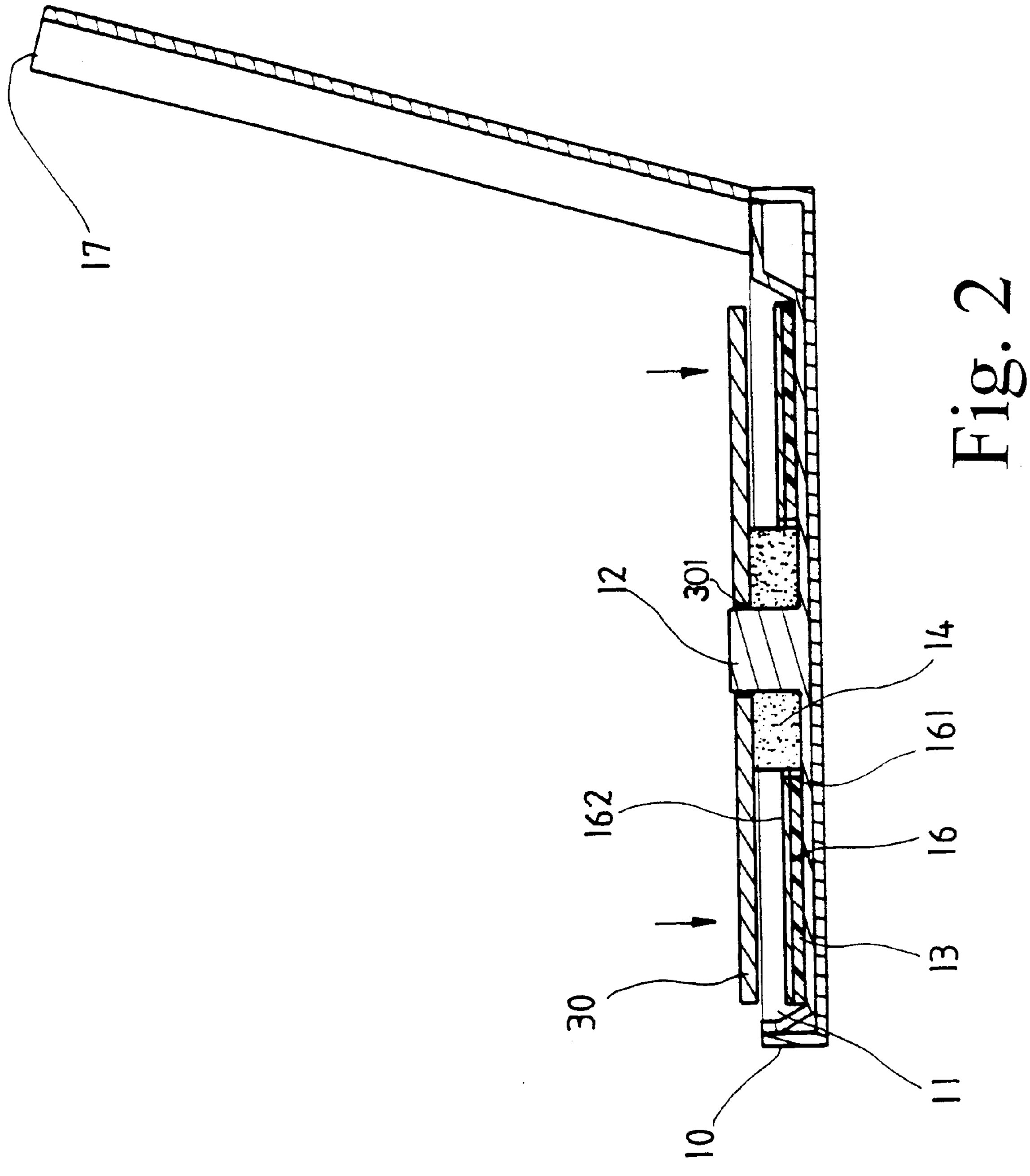
FIG. 2 is a sectional assembled view of the preferred embodiment.
Figure 3:
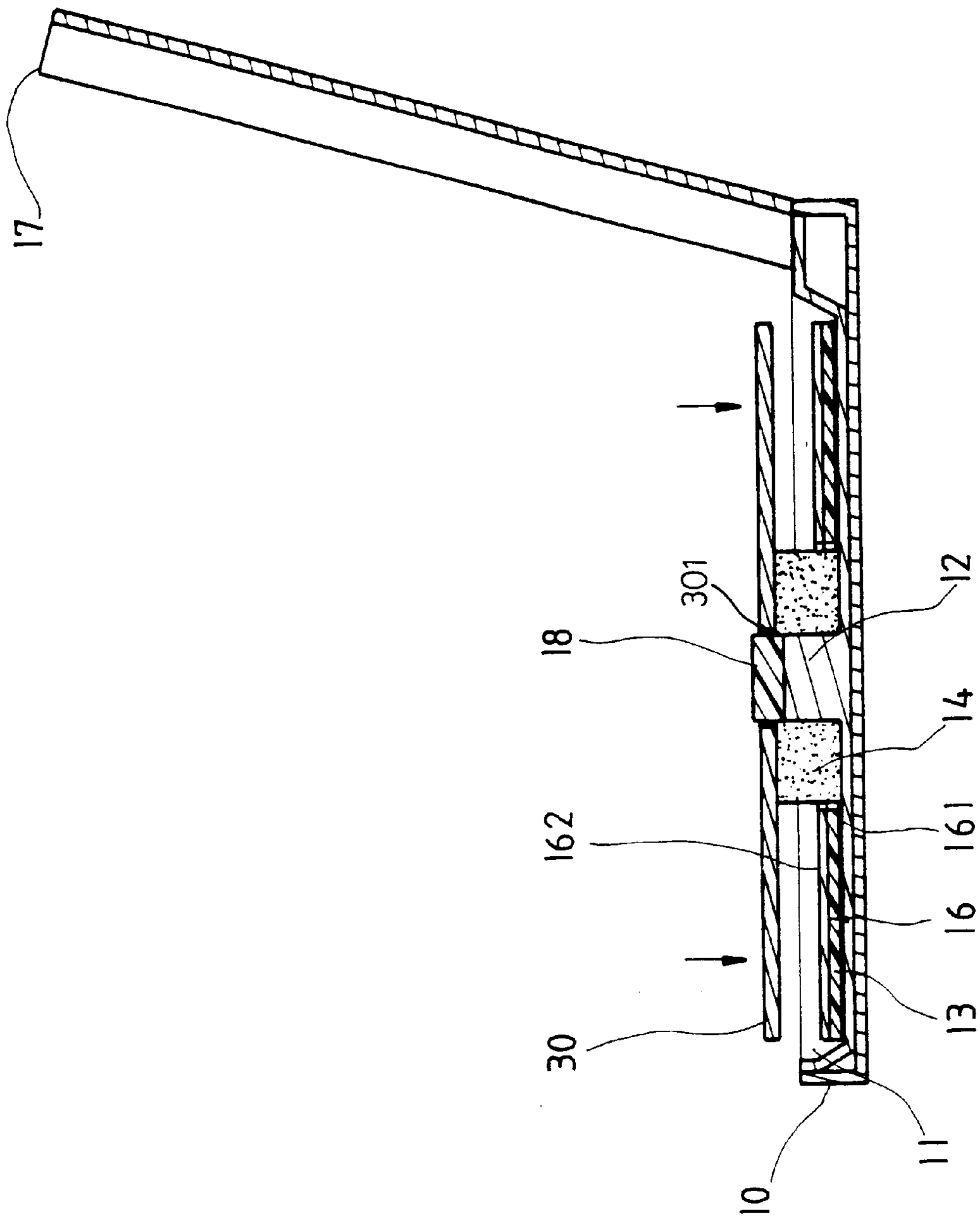
FIG. 3 is a schematic view of another preferred embodiment of the present invention.

With reference to FIGS. 1, 2, 3, and 4, a preferred embodiment of a disk label positioning structure according to the present invention is shown to include a base 10 having a receiving space 11 for supporting a disk 30. The receiving space 11 is centrally provided with a post 12. An elastic material 13 of a height smaller than that of the post 12 is disposed in a suitable position between an outer periphery of the receiving space 11 and a certain distance from an outer rim of the post 12.

In the present invention, an elastic element 14 (see FIG. 2) of a height smaller than that of the post 12 but greater than that of the elastic material 13 is disposed between an inner periphery of the elastic material 13 and the outer edge of the post 12. In this preferred embodiment, the elastic element 14 is a foam element which, as is well known to those in the art, can be substituted by equivalent elements.

When the user wishes to adhere a label 16 of a size substantially the same as that of the disk 30 to the disk 30 (see FIGS. 1 and 2), it is only necessary to fit over the outer periphery of the elastic element 14 such that an adhering face 162 of the label 16 is oriented upwardly on the elastic material 13. A through disk hole 301 of the disk 30 is then fitted over the outer edge of the post 12 with the side to be adhered to the label 16 facing downwardly, and the disk 30 is placed on the elastic element 14. At this time, the user can exert a downwardly force in a uniform manner to press the elastic element 14 downwardly so that counter-action of the pressed elastic material 13 causes the disk 30 to be precisely and firmly adhered to the adhering face 162 of the label 16.

Furthermore, the base 10 is provided with a cover 17 on one side to protect the disk 30 in the receiving space 11 and to facilitate carrying and storage of the present invention.

In the present invention, the post 12 may be further provided with an elastic portion 18 (see FIG. 3) to increase the height of the post 12 so as to facilitate fitting of the disk 30 over the post 12 and positioning thereof on the elastic element 14. At the same time, when the cover 17 on one side of the base 10 is placed in position, due to the elasticity of the elastic element 14, the cover 17 will not be affected by the height of the post 12 and can compress the elastic element 14 to rest on top of the base 10 properly.

Figure 4:
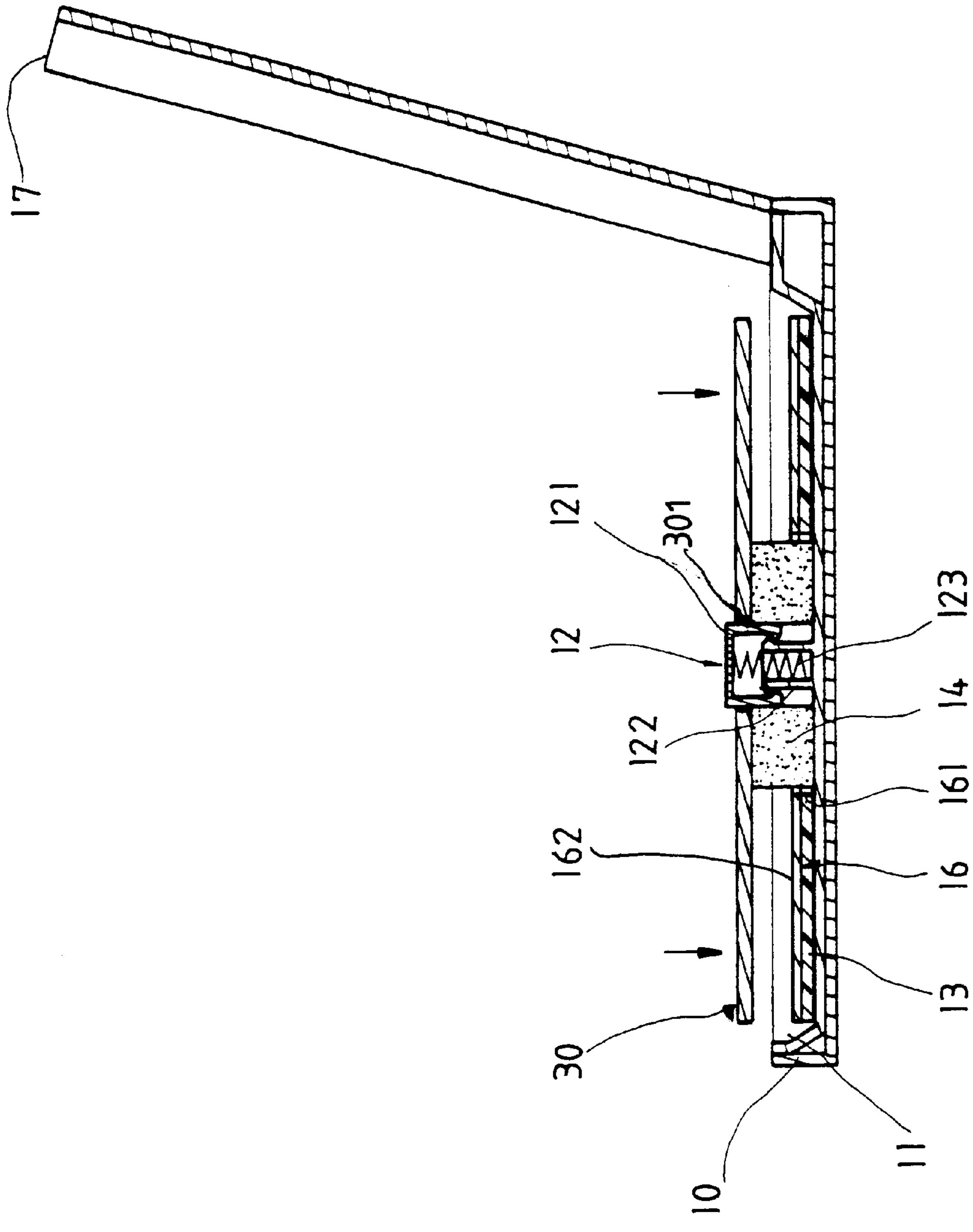
FIG. 4 is a schematic view of a further preferred embodiment of the present invention.

In the present invention, the post 12 may include two inter-engaged hollow post elements 121, 122 of different external diameters (see FIG. 4). In this modified embodiment, the hollow post elements 121, 122 are internally provided with a spring 123, whereby the disk 30 can be easily fitted over the post 12 to rest flatly on the elastic element 14. Moreover, when the cover 17 on one side of the base 10 is put in place, due to the elasticity of the spring 123, it will not be affected by the height of the post 12 and can compress the post 12 to rest properly on top of the base 10.

Although the present invention has been illustrated and described with reference to the preferred embodiment thereof, it should be understood that it is in no way limited to the details of such embodiment but is capable of numerous modifications within the scope of the appended claims.

What is claimed is:

1. A disk label positioning structure comprising:

a base having a completely flat receiving space adapted to receive a disk, said receiving space centrally provided with a post adapted for positioning a through hole of said disk;

an elastic element including an opening, the elastic element provided in said receiving space with the opening of the elastic element positioned through said post;

the elastic element sized to receive a through hole of a label, the label positioned on the receiving space of the base, the elastic element having a height smaller than that of said post; and said label having a throughole fitted through and positioned at an outer periphery of said elastic element, said label including an adhering face and being disposed in said receiving space with the adhering face facing upwards away from the elastic material, said disk being fitted through and positioned at said outer edge of said post above said elastic element, with a face facing downwards opposite the adhering face of said label, said disk being pushed downwards by a uniform application of force to displace said elastic element downwards to force the face of said disk to precisely contact the adhering face of said label so that said label adheres to the disk.

2. The disk label positioning structure as defined in claim 1, further comprising an elastic material disposed in said receiving space at said outer periphery of said elastic element, said elastic material having a height smaller than that of said elastic element such that upon a uniform application of downward force on said disk, said elastic element displaces downwardly towards the base, and said elastic material rebounds when the downward force is released to cause the face of said disk to adhere firmly to the adhering face of said label.

3. The disk label positioning structure as defined in claim 1, wherein said base further comprises a cover disposed on one side thereof, said cover being adapted to close said disk in said receiving space.

4. The disk label positioning structure as defined in claim 1, wherein said post further comprises an elastic portion positioned over the post to increase the height of the post so that said disk is easily positioned over the post to increase the height of the post so that said disk is easily positioned through said post opposite said elastic material, whereby when a cover provided on one side of said base is closed toward the base, said cover will compress said elastic element.

5. The disk label positioning structure as defined in claim 1, wherein said post comprises two inter-engaged hollow post elements of different diameters, said two hollow post elements accommodating therein a spring, said two hollow post elements being adapted to enable said disk to be fitted through said post and be flatly disposed on said elastic element, whereby when a cover provided on one side of said base closes the base, said cover will compress against said elastic element.

6. The disk label positioning structure as defined in claims 1, 2 or 3, wherein said elastic element comprises a foamed material.

* * * * *